(12) United States Patent
Hahn

(10) Patent No.: US 10,003,993 B2
(45) Date of Patent: Jun. 19, 2018

(54) SUBSCRIBER HANDLING IN RADIO TELECOMMUNICATION NETWORKS

(75) Inventor: Wolfgang Hahn, Bergfelde (DE)

(73) Assignee: Provenance Asset Group LLC, Essex, CT (US)

( * ) Notice: Subject to any disclaimer, the term of this patent is extended or adjusted under 35 U.S.C. 154(b) by 427 days.

(21) Appl. No.: 13/877,463

(22) PCT Filed: Oct. 6, 2010

(86) PCT No.: PCT/EP2010/064919
§ 371 (c)(1),
(2), (4) Date: Apr. 3, 2013

(87) PCT Pub. No.: WO2012/045342
PCT Pub. Date: Apr. 12, 2012

(65) Prior Publication Data
US 2013/0188480 A1 Jul. 25, 2013

(51) Int. Cl.
| | |
|---|---|
| *H04W 28/02* | (2009.01) |
| *H04W 8/12* | (2009.01) |
| *H04W 8/26* | (2009.01) |
| *H04W 28/24* | (2009.01) |
| *H04W 36/22* | (2009.01) |
| *H04W 88/12* | (2009.01) |

(52) U.S. Cl.
CPC ....... *H04W 28/0215* (2013.01); *H04W 28/02* (2013.01); *H04W 8/12* (2013.01); *H04W 8/26* (2013.01); *H04W 28/24* (2013.01); *H04W 36/22* (2013.01); *H04W 88/12* (2013.01)

(58) Field of Classification Search
CPC . H04W 28/02; H04W 28/0215; H04W 36/22; H04W 28/10; H04W 76/025; H04W 28/14; H04W 88/16; H04W 8/12; H04W 84/045; H04W 8/26; H04W 8/04; H04W 28/24; H04W 76/021–76/022; H04L 47/14; H04L 47/2441
USPC ....... 370/229, 328, 331, 235, 230, 338, 401, 370/329; 455/433, 452.2, 422.1, 432.1, 455/432.3, 435.1
See application file for complete search history.

(56) References Cited

U.S. PATENT DOCUMENTS

| | | | |
|---|---|---|---|
| 6,775,280 B1 * | 8/2004 | Ma | H04L 45/00 370/230 |
| 7,738,452 B1 * | 6/2010 | O'Rourke | H04L 47/125 370/389 |
| 8,432,871 B1 * | 4/2013 | Sarnaik | H04W 28/0289 370/331 |
| 2004/0125748 A1 | 7/2004 | Hurtta et al. | |

(Continued)

FOREIGN PATENT DOCUMENTS

EP  1672845 A1  6/2006

OTHER PUBLICATIONS

International Search Report and Written Opinion dated Jul. 1, 2011 corresponding to International Patent Application PCT/EP2010/064919.

*Primary Examiner* — Jamal Javaid
*Assistant Examiner* — Rose Clark
(74) *Attorney, Agent, or Firm* — Dinsmore & Shohl LLP

(57) ABSTRACT

A method for radio network subscriber handling is provided comprising storing a list of gateway addresses in a radio network node, and performing radio network subscriber handling actions based on information stored in said list of gateway addresses.

23 Claims, 4 Drawing Sheets

(56) References Cited

U.S. PATENT DOCUMENTS

| | | | |
|---|---|---|---|
| 2004/0248583 A1 | 12/2004 | Satt et al. | |
| 2004/0264368 A1 | 12/2004 | Heiskari et al. | |
| 2006/0227705 A1* | 10/2006 | Chandwadkar | H04L 47/10 370/229 |
| 2006/0233101 A1* | 10/2006 | Luft | H04L 47/20 370/229 |
| 2008/0002727 A1* | 1/2008 | Yamane | H04L 12/1836 370/401 |
| 2009/0016292 A1* | 1/2009 | Viswanath | H04W 28/08 370/329 |
| 2009/0217326 A1* | 8/2009 | Hasek | H04N 7/17336 725/87 |
| 2009/0219826 A1* | 9/2009 | Linkola et al. | 370/252 |
| 2010/0020685 A1* | 1/2010 | Short | H04L 12/14 370/230 |
| 2010/0130170 A1* | 5/2010 | Liu | H04W 36/0022 455/411 |
| 2010/0278108 A1* | 11/2010 | Cho | H04W 76/022 370/328 |
| 2010/0332615 A1* | 12/2010 | Short | H04L 63/08 709/217 |
| 2011/0016209 A1* | 1/2011 | Moncaster | H04L 43/0852 709/224 |
| 2011/0075675 A1* | 3/2011 | Koodli et al. | 370/401 |
| 2011/0103310 A1* | 5/2011 | Stojanovski et al. | 370/328 |
| 2011/0170517 A1* | 7/2011 | Bakker | H04W 36/0033 370/331 |
| 2011/0171953 A1* | 7/2011 | Faccin | H04W 48/08 455/426.1 |
| 2011/0281584 A1* | 11/2011 | Sander | H04W 12/08 455/436 |
| 2011/0295996 A1* | 12/2011 | Qiu | G06F 9/505 709/224 |
| 2012/0044949 A1* | 2/2012 | Velev et al. | 370/401 |
| 2012/0076047 A1* | 3/2012 | Turanyi | H04W 76/02 370/254 |
| 2012/0110197 A1* | 5/2012 | Miklos | H04W 36/12 709/228 |
| 2012/0214445 A1* | 8/2012 | Stojanovski et al. | 455/411 |

* cited by examiner

SUBSCRIBER HANDLING IN RADIO TELECOMMUNICATION NETWORKS

FIELD OF THE INVENTION

The exemplary and non-limiting embodiments of this invention relate generally to communications networks and particularly to mobile telecommunication networks. More specifically, certain embodiments of the invention are directed to methods, apparatuses and systems for subscriber handling in radio access networks.

BACKGROUND ART

In $3^{rd}$ generation partnership project (3GPP) standardization, a multitude of different access systems are being specified that lead to a situation where mobile network operator (MNO) networks consist of different cell types: different access network generations, such as 2G, 3G, high-speed packet access (HSPA), and long-term evolution (LTE); different carriers inside each access network generation; and different cell size (e.g. macro, pico, femto). A network consisting of different cell types is usually referred to as a heterogeneous network (HetNet). Under HetNet work items, 3GPP radio access network (RAN) groups are working on solutions e.g. to cope with interference issues that femto cells may cause in a macro cell environment.

HetNets having several different radio access technologies (RATs) with overlapping coverage requires new traffic management mechanisms and allows for optimization of network efficiency and user experience. Such scenario is expected especially in dense populated areas, e.g. cities.

In addition, to cope with the huge increase of data traffic, 3GPP release 10 has defined mechanisms to offload traffic from a MNO's core network. A solution to bypass MNO's core network with subscriber data traffic is attracting interest from manufacturers and operators. Currently, a work item for local internet protocol (IP) access (LIPA) and selected IP traffic offload (SIPTO) has been established and a SIPTO solution for release 10 with local gateway (GW) selection has been selected. Via this local GW all traffic of selected subscribers and directed to selected destinations (e.g. to the Internet) can be offloaded from the mobile operators network. With the LIPA feature traffic directed to a local home or enterprise network can directly access these networks without traversing the operator's core network. (This feature is defined in 3GPP release 10 for home-cells/home networks only.)

The SIPTO feature is intended to differentiate subscribers' IP traffic so that a certain amount of IP traffic to/from IP devices connected to the cellular network or to a home based network (HNB) is forwarded on the shortest path out of the MNO's network, especially internet bulk data traffic to the internet.

The RAN has a possibility to steer traffic, for example to allow equally loaded cells by redirection or to handover subscribers e.g. from a macro cell to a pico cell in a hot spot. The target is efficient utilization of network resources and high user experience. For this procedure RAN specific criteria and algorithms are used, taking into account e.g. load of a cell and signal strength.

It would further enhance the efficiency of the algorithms if it was possible to take subscriber specific attributes into account. For example, it does not make sense to handover—for load balancing reasons—a subscriber that is consuming only very little radio resources, especially because also handover procedures as such require signaling resources from the network. However, due to the function split between radio and core network, this information is not available in the RAN. The reason is that the RAN should not be loaded with tasks like storing subscriber information.

One possibility would be that the core network would, in the process of establishing radio bearers, add additional information about subscribers to the relevant signaling messages, e.g. that this is a flat rate subscriber, or some categories like gold/silver subscribers. But this would require enhancing the RAN—core network interface (Iu, S1), storing the subscriber information per bearer context and it would also violate the RAN—core function split.

In 3GPP release 8, a mechanism is defined (RFSP=RAT/Frequency Selection Index) that allows to distribute subscribers (e.g. according to terminal capabilities) across different RATs. This allows some global balancing of the operators' subscribers to the available bandwidths distributed over different RATs and different carriers. However, there is no further intelligence defined for RAT and cell selection to take into account other subscriber characteristics in combination with dynamic load situations in cells.

Thus, there is a need to find a more simple solution, also to allow implementation in near term to solve current challenges.

SUMMARY

It is therefore an object of this invention to address some of the above mentioned problems by providing a method, an apparatus and a computer program product for subscriber handling in telecommunication networks, preferably in HetNets.

According to a first aspect of the invention, there is provided a method for radio network subscriber handling comprising storing a list of gateway addresses in a radio network node, for example an evolved node B (eNB) or a radio network controller (RNC), and performing radio network subscriber handling actions, for example traffic steering or load balancing, based on information stored in said list of gateway addresses. According to a further embodiment, said performing radio network subscriber handling actions comprises detecting/checking an address of a gateway to which a subscriber is connected, comparing whether said address of said gateway is included in said list of gateway addresses stored in said radio network node, and making a subscriber handling decision relating to said subscriber based on said step of comparing. According to a further embodiment, the method further comprises detecting a need for a radio network subscriber handling decision, for example detecting congestion in a cell or a radio network overload situation.

In some embodiments, said list of gateway addresses comprises at least one internet protocol address. In some embodiments, said list of gateway addresses comprises at least one address of at least one gateway belonging to a gateway class. In some embodiments said gateway class comprises high performance gateways (HP GW) that are specially suited for high bandwidth traffic to the internet, local internet protocol access gateways (LIPA GW), selected internet protocol traffic offload gateways (SIPTO GW), and/or enterprise gateways.

In some embodiments, said list of gateway addresses comprises at least one address of at least one gateway, said address being allocated to a specific subscriber type. In some embodiments, said specific subscriber type comprises at least one of flat data rate subscribers, subscribers with specific requirements for quality of service, high priority subscribers, and/or low priority subscribers.

According to a further embodiment, said subscriber handling decision comprises differentiated subscriber handling in radio network overload situation. In some embodiments, subscribers of lower priority are dropped from said overloaded radio network.

According to a further embodiment, said subscriber handling decision comprises an idle mode traffic steering decision. This decision can be made when forcing a subscriber from active to idle mode during this change operation: in active mode the radio node is connected to the GW and has a valid GW address of the subscriber that can be evaluated. In some embodiments, said idle mode traffic steering decision comprises keeping at least one subscriber of a specific subscriber type within a certain radio network technology.

According to a further embodiment, said subscriber handling decision comprises a handover decision to keep a subscriber connected to an enterprise gateway within enterprise cells.

According to a second aspect of the invention, there is provided a radio network node, preferably a radio network control node, for example an evolved node B (eNB) or a radio network controller (RNC), comprising a memory configured to store a list of gateway addresses, and a processor configured to perform radio network subscriber handling actions, for example traffic steering or load balancing, based on information stored in said list of gateway addresses.

According to a further embodiment, said processor is further configured to detect/check an address of a gateway to which a subscriber is connected, to compare whether said address of said gateway is included in said list of gateway addresses stored in said radio network node, and to make a subscriber handling decision relating to said subscriber based on said step of comparing. According to a further embodiment, said processor is further configured to detect a need for a radio network subscriber handling decision, for example to detect congestion in a cell or radio network overload situation.

In some embodiments, said list of gateway addresses comprises at least one internet protocol address. In some embodiments, said list of gateway addresses comprises at least one address of at least one gateway belonging to a gateway class. In some embodiments, said gateway class comprises high performance gateways (HP GW) that are specially suited for high bandwidth traffic to the internet, local internet protocol access gateways (LIPA GW), selected internet protocol traffic offload gateways (SIPTO GW), and/or enterprise gateways.

In some embodiments, said list of gateway addresses comprises at least one address of at least one gateway, said address being allocated to a specific subscriber type. In some embodiments, said specific subscriber type comprises at least one of flat data rate subscribers, subscribers with specific requirements for quality of service, high priority subscribers, and/or low priority subscribers.

According to a further embodiment, said subscriber handling decision comprises differentiated subscriber handling in radio network overload situation. In some embodiments, subscribers of lower priority are dropped from said overloaded radio network.

According to a further embodiment, said subscriber handling decision comprises an idle mode traffic steering decision. This decision can be made when forcing a subscriber from active to idle mode during this change operation: in active mode the radio node is connected to the GW and has a valid GW address of the subscriber that can be evaluated. In some embodiments, said idle mode traffic steering decision comprises keeping at least one subscriber of a specific subscriber type within a certain radio network technology.

According to a further embodiment, said subscriber handling decision comprises a handover decision to keep a subscriber connected to an enterprise gateway within enterprise cells.

According to a third aspect of the invention, there is provided a computer program product containing an executable code configured to perform a method according to any embodiment of the invention when executed in a computing device.

Although the various aspects, embodiments and features of the invention are recited independently, it should be appreciated that all combinations of them are possible and within the scope of the present invention as claimed.

The invention may provide benefits in particular in managing a heterogeneous networks but may also lead to advantages for a single RAT homogeneous network for using subscriber information in RAN traffic steering decisions. It allows for short term solutions and implementation in multivendor environment.

DETAILED DESCRIPTION OF SOME EMBODIMENTS

MNOs today have a lot of knowledge about subscribers/users. It can be collected from contract data (e.g. flat rate subscriber), by scanning subscriber behavior history (e.g. evaluating charging records) and from other sources. This knowledge can be used to classify subscribers differently in the home subscriber server (HSS) subscription data, e.g. by setting specific values for charging characteristics defining a specific subscriber type. In HSS subscriber data, also special flags can be set that indicate e.g. services the subscriber is entitled to. For example, according to 3GPP release 10, a SIPTO flag in a subscribers subscription data is used to indicate whether a connection to a specific access point name (APN) is enabled/disabled for SIPTO.

All this knowledge can also be used in session management to select a specific gateway (GW), e.g. a gateway general packet radio service (GPRS) support node (GGSN) in case of 3G or a packet data network gateway (PDN-GW or P-GW) in case of LTE to attach the subscriber to.

One use case is to apply internet offload to "flat rate" subscribers by selecting a local GW, according the above mentioned SIPTO solution.

Another use case is the selection of new powerful high performance (HP) GWs that have been deployed by operators to cope with higher data traffic volume in HSPA or LTE without removing existing less capable GWs.

In the present invention, this information about subscriber types and different gateways is used in RAN for resource management and traffic steering algorithms.

A prerequisite for the invention is that the mobile network is already deployed as a high data rate optimized flat architecture with only one user plane node in the core network. For 3G it means that the direct tunnel feature is used that directly connects the radio network controller (RNC) of RAN with the GGSN of core network. In LTE case it means that the serving GW (S-GW) and PDN-GW are collocated (in so called S/P-GW). In case of separated S-GW and P-GW the proposed solution could be then also applied for a subscriber dependent S-GW selection.

Figure 1:
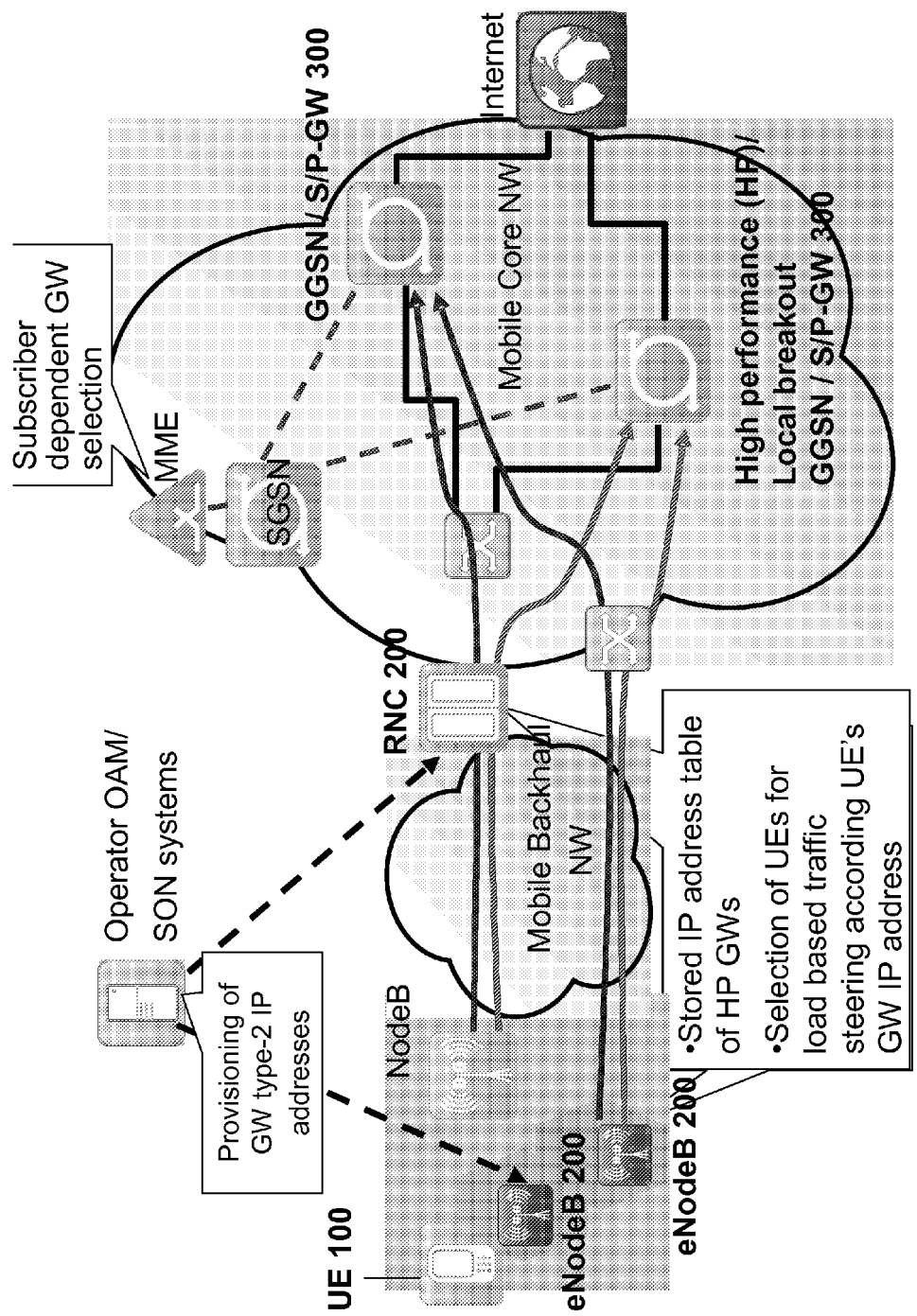
FIG. 1 illustrates a HetNet scenario of an embodiment of the invention

FIG. 1 illustrates a HetNet scenario according to an embodiment of the invention. User equipment (UE) 100 are connected to radio network control nodes 200 (either directly or via base stations), hereinafter quoted as "RAN nodes" or eNB/RNC. The relevant RAN node is an RNC 200 in case of 3G and an eNB 200 in case of LTE. The RAN nodes 200 have connections to MNOs operations, administrations and maintenance (OAM) and/or self-optimizing network (SON) systems. The RAN nodes 200 are also connected to core network gateway elements, e.g. GGSN or P/S-GW 300 and to core network control nodes, e.g. serving GPRS support node (SGSN) in case of 3G or mobility management entity (MME) in case of LTE in order to set up data bearers for the mobile network subscribers and in this process select the GWs out of the different GW classes/types. In the embodiments of the invention, the term "subscriber" stands for a user and for a mobile terminal (MT), mobile station (MS) or a user equipment (UE) that the user/subscriber is using for communicating in the mobile telecommunication network.

According to the embodiments of the invention, the RNC/evolved NodeB (eNB) 200 is provided during power up or at a later configuration phase with configuration data that includes a list or a table of gateway IP addresses (possibly enhanced with other attributes), that belong to specific core network gateway elements 300. The table may comprise e.g. HP gateways, SIPTO gateways, LIPA, enterprise and closed subscriber group (CSG) gateways—or only one/some of them—and it also includes qualifiers defining the type of each particular gateway in the table.

The configuration data is provided by OAM methods or in some SON schemas (e.g. a GW may advertise its capabilities to OAM system and/or to RAN nodes). The address table is stored in the RNC/eNB 200 and when running resource, traffic or load management algorithms (or any other algorithms relating to subscriber handling), the RNC/eNB 200 can check if a subscriber 100 is connected to one of these listed GWs. This information is then taken into account in subscriber handling decision making, e.g. in traffic management.

The invention can also be enhanced by including subscriber type information within gateway address table, as embedded in the different GW types. For example, the MNO may have established different "GW classes", e.g:

Class 1. normal subscribers without any flat rate subscription
-> no specific GW addresses in the list
Class 2. high volume and high quality (premium) flat rate subscribers that generate high average revenue per subscriber (ARPU) to the MNO
-> IP address in list with an additional high quality bit set
Class 3. high volume flat-rate subscribers with no quality requirements and low ARPU contract
-> IP address in list but not high quality bit set
Class 4. local enterprise subscriber (allowed to access the local resources of that enterprise)
-> IP address in the list as a LIPA/CSG/Enterprise GW In addition to these examples, there may be further or alternative defined gateway classes. It is also possible to have different subscriber types within a gateway class, to use more subscriber information in load balancing decision making. It can be implemented by applying multi homing scenarios in the GWs, i.e. the GWs are accessed via different IP addresses which correspond to different subscriber types.

Figure 2:
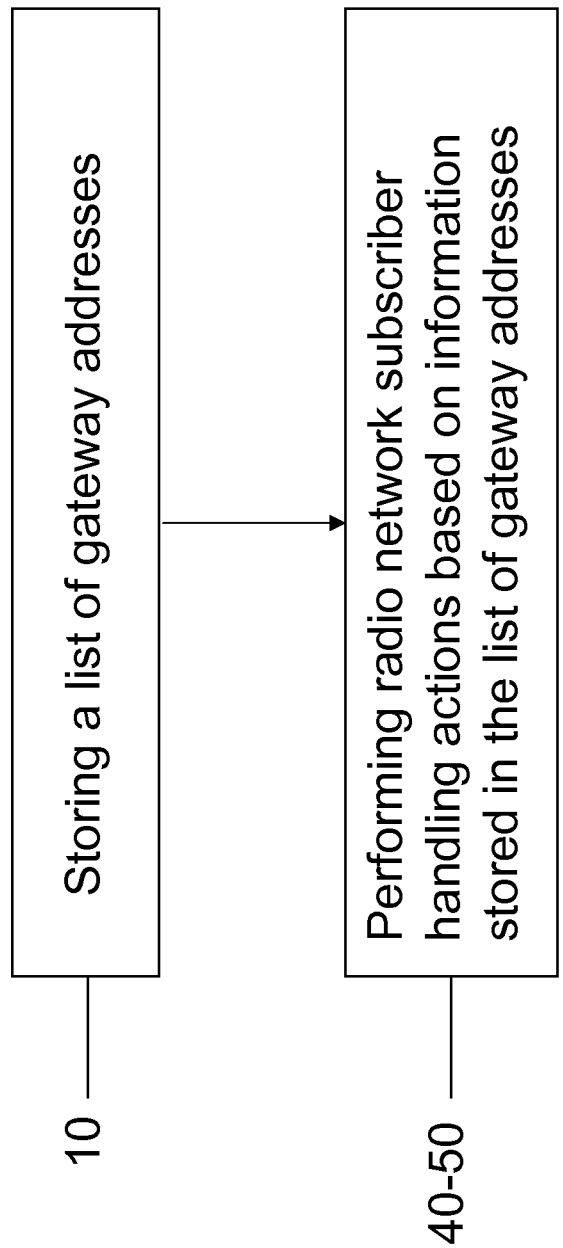
FIG. 2 illustrates a method according to an embodiment of the invention
Figure 3:
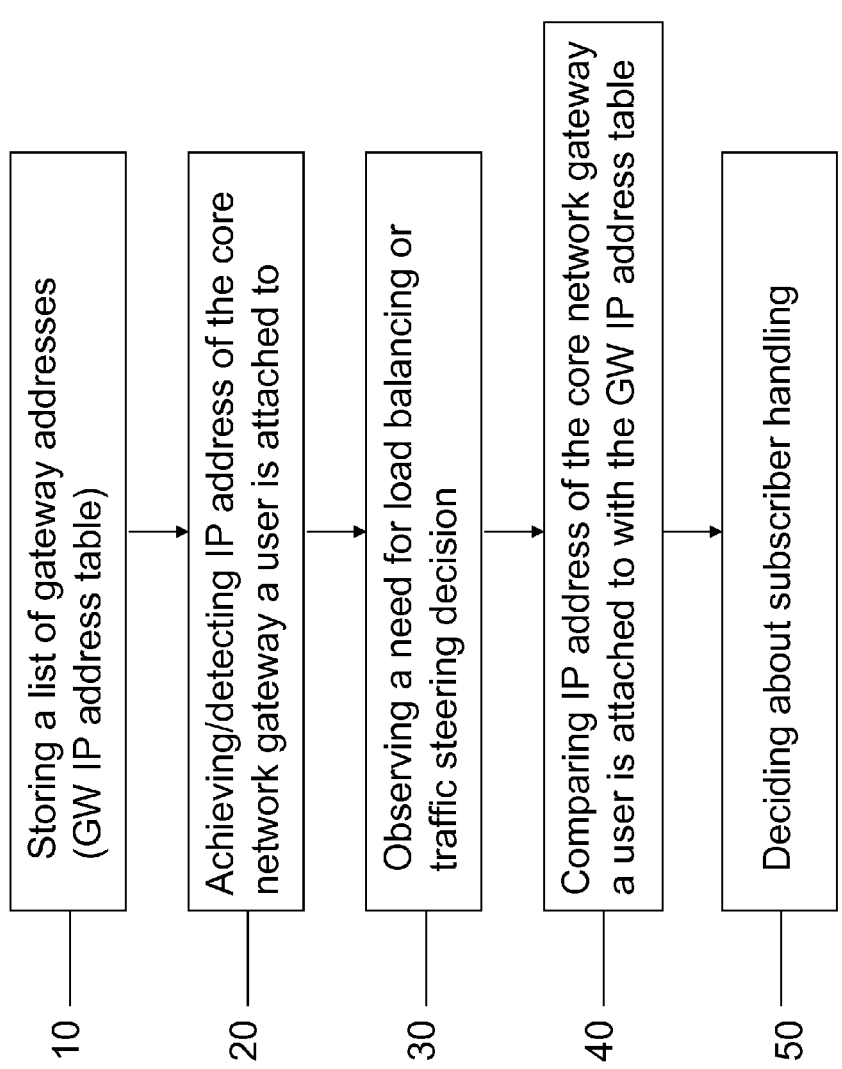
FIG. 3 illustrates a further method according to an embodiment of the invention
Figure 4:
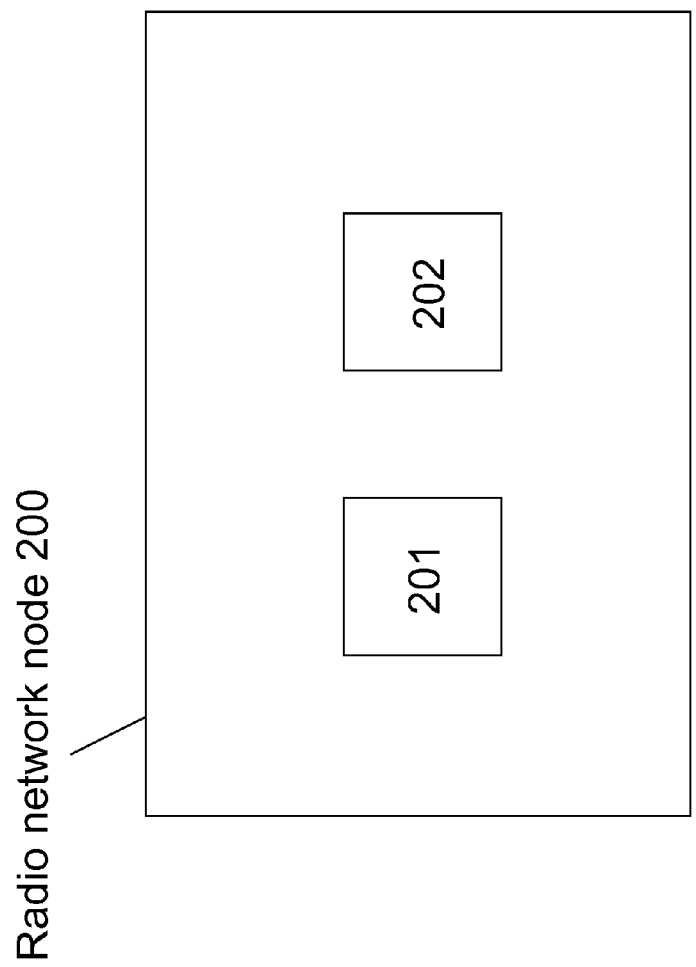
FIG. 4 illustrates a radio network node according to an embodiment of the invention

According to a method of the invention, as illustrated in embodiments of FIGS. 2 and 3, a controlling element of the RAN 200, e.g. eNB (in case of LTE) or an RNC (in case of 3G) with direct tunnel feature activated, stores 10 a table/list of core network gateway addresses and qualifiers. In the course of setting up a data bearer for a subscriber, the eNB/RNC 200 is provided 20 with the IP address of the core network GW 300, e.g. a S/P-GW (in case of LTE) or a GGSN (in case of 3G), for establishing a GPRS tunneling protocol (GTP) tunnel between the RAN node 200 and the core network gateway 300.

In a congestion/overload situation, e.g. when a macro cell is near its capacity limit, the eNB/RNC 200 observes 30 that there is a need for load balancing or traffic steering decisions regarding subscribers 100 in the congested cell. When deciding 50 about subscriber handling, the eNB/RNC 200 checks if a subscriber 100 is connected to a GW 300 listed in the table by comparing 40 the tunnel end point IP address with the GW IP address table in the configuration data. In this way the eNB/RNC 200 achieves additional information about the subscriber 100 and can take it into account in decision making. For example, in overload situations treat subscribers with lower/higher priority e.g. if traffic shaping or dropping of subscribers is needed. In IDLE mode traffic steering decisions, keep subscribers of certain type in certain RAT (radio access technology), e.g. flat rate users in LTE. For users connected to Enterprise GW adapt HO algorithms, prefer HO within Enterprise cells (e.g. CSG cells).

EXAMPLE 1

The MNO defines three classes of GWs and subscriber types:
Standard subscriber/GW class 1
-> no IP address in GW address table
flat-rate high quality subscriber/GW class 2 (HP)
-> GW IP address in GW address table and high quality bit set
flat-rate low margin subscriber/GW class 3 (HP)
-> GW IP address in GW address table, high quality bit not set
This allows for enhanced traffic management algorithms. Possible examples are:
1a.)
3G or LTE Case:
A macro cell is near its capacity limit. (Radio resource management (RRM) may have some load information of neighbouring pico cells.) Pico cells in hot spots working at different frequency.
A UE 100 is going from active to idle mode. The eNB/RNC 200 checks if this subscriber 100 is connected to an HP GW 300 by comparing the tunnel end point IP address with the GW IP address table in the configuration data before the Iu/S1 UP connection to the GW is released. If the GW 300 is of class 2 or class 3 the eNB/RNC 200 releases the UE with redirection information to different RAT/frequency during radio resource control (RRC) connection release procedure.

1b.)
3G Case:

A Macro Cell is near its capacity limit. In connected mode the RRM may perform a load balancing HO from a macro cell to a pico/femto cell. The RRM selects candidate subscribers 100 based on bearers connected to selected GWs 300 of HP-GW class 2 (in addition to measurement reports of the subscriber equipment (UEs) 100).

1c.)
LTE (No Support of Load Balancing HO):

In congestion situations bearers of subscribers 100 connected to GW class 3 are released or quality of service (QoS) is down graded at the radio bearer.

EXAMPLE 2

Subscribers 100 that have access to the RAN nodes 200 of an enterprise may be connected to GWs 300 in the operator core NW or, if access to local resources is needed, to a GW 300 that is deployed in the enterprise location. Since the RAN nodes 200 are aware of the connection to a local GW 300, the parameters of the HO procedures can be modified to keep the subscriber as long as possible in the local RAN nodes of the enterprise.

In this case, it is advantageous to enhance RAN algorithms to have the knowledge to what type of GW 300 the subscriber 100 is connected to. E.g. advanced HO algorithms in HetNets take also into account the speed of the UE 100: For subscribers 100 with a higher speed a HO to a macro cell is preferred to reduce the number of HO. But to subscribers 100 connected to a GW 300 located in an enterprise this strategy may increase the number of GW relocations which may be even worse. So an adapted algorithm should hold subscribers 100 in RAN nodes of the enterprise as long as possible.

An advantage of the solution is that the RAN node 200 does not need to hold new state information about the subscriber 100 and can check the "subscriber type" when needed.

With the provided invention an end-to-end concept for traffic management can be implemented taking into account the radio situation as well as the core NW deployment. An MNO can also use the GW class concept for dimensioning and load balancing in the core NW e.g.:

Planning/dimensioning with higher resource utilization in the GW class 3 of the Example 1 (High performance, low quality) than in the GW class 2 to achieve best user experience for type 2 (high ARPU) subscribers.

In class 3 GW, in addition to the described traffic steering in RAN, a QoS downgrading mechanisms could be applied in case of high NW load.

In case of providing the local breakout feature (SIPTO), a higher number of GWs is available in the NW and this corresponds with the flat rate usage and subscriber scenario.

The invention claimed is:

1. A method for radio network subscriber handling comprising:
   storing a list of gateway addresses in a radio network node, and
   performing radio network subscriber handling actions based on information stored in said list of gateway addresses, wherein said performing radio network subscriber handling actions comprises:
   detecting an internet protocol address of a core network gateway to which a subscriber is connected,
   comparing whether said internet protocol address of said core network gateway is included in said list of gateway addresses stored in said radio network node, and
   making a subscriber handling decision relating to said subscriber based on said step of comparing,
   wherein said list of gateway addresses includes a quality bit that signals a quality of service for a subscriber type.

2. The method of claim 1, wherein said list of gateway addresses comprises at least one internet protocol address.

3. The method of claim 1, wherein said list of gateway addresses comprises at least one address of at least one gateway belonging to a gateway class.

4. The method of claim 3, wherein said gateway class comprises at least one of high performance gateways, local internet protocol access gateways, selected internet protocol traffic offload gateways, and enterprise gateways.

5. The method of claim 1, wherein said list of gateway addresses comprises at least one address of at least one gateway, said address being allocated to the subscriber type.

6. The method of claim 5, wherein the subscriber type comprises at least one of flat data rate subscribers, subscribers with specific requirements for quality of service, high priority subscribers, and low priority subscribers.

7. The method of claim 1, wherein said subscriber handling decision comprises differentiated subscriber handling in radio network overload situation.

8. The method of claim 7, wherein subscribers of lower priority are dropped from said overloaded radio network.

9. The method of claim 1, wherein said subscriber handling decision comprises an idle mode traffic steering decision.

10. The method of claim 9, wherein said idle mode traffic steering decision comprises keeping at least one subscriber of the subscriber type within a certain radio network technology.

11. The method of claim 1, wherein said subscriber handling decision comprises a handover decision to keep a subscriber connected to an enterprise gateway within enterprise cells.

12. A radio network node comprising:
   a memory configured to store a list of gateway addresses, and
   a processor configured to perform radio network subscriber handling actions based on information stored in said list of gateway addresses, wherein said performing radio network subscriber handling actions comprises:
   detecting an internet protocol address of a core network gateway to which a subscriber is connected,
   comparing whether said internet protocol address of said core network gateway is included in said list of gateway addresses stored in said radio network node, and
   making a subscriber handling decision relating to said subscriber based on said step of comparing,
   wherein said list of gateway addresses includes a quality bit that signals a quality of service for a subscriber type.

13. The radio network node of claim 12, wherein said list of gateway addresses comprises at least one internet protocol address.

14. The radio network node of claim 12, wherein said list of gateway addresses comprises at least one address of at least one gateway belonging to a gateway class.

15. The radio network node of claim 14, wherein said gateway class comprises at least one of high performance gateways, local internet protocol access gateways, selected internet protocol traffic offload gateways, and enterprise gateways.

16. The radio network node of claim 12, wherein said list of gateway addresses comprises at least one address of at least one gateway, said address being allocated to the subscriber type.

17. The radio network node of claim 16, wherein the subscriber type comprises at least one of flat data rate subscribers, subscribers with specific requirements for quality of service, high priority subscribers, and low priority subscribers.

18. The radio network node of claim 12, wherein said subscriber handling decision comprises differentiated subscriber handling in radio network overload situation.

19. The radio network node of claim 18, wherein subscribers of lower priority are dropped from said overloaded radio network.

20. The radio network node of claim 12, wherein said subscriber handling decision comprises an idle mode traffic steering decision.

21. The radio network node of claim 20, wherein said idle mode traffic steering decision comprises keeping at least one subscriber of a specific subscriber type within a certain radio network technology.

22. The radio network node of claim 12, wherein said subscriber handling decision comprises a handover decision to keep a subscriber connected to an enterprise gateway within enterprise cells.

23. The radio network node of claim 12 comprising an evolved node B or a radio network controller.

\* \* \* \* \*